United States Patent
Kamphuis

(10) Patent No.: US 8,308,401 B2
(45) Date of Patent: Nov. 13, 2012

(54) CUTTER FOR MACHINING COUNTERBORE IN ENGINE BLOCK

(75) Inventor: Dwain L. Kamphuis, West Olive, MI (US)

(73) Assignee: K-Line Industries, Inc., Holland, MI (US)

( * ) Notice: Subject to any disclaimer, the term of this patent is extended or adjusted under 35 U.S.C. 154(b) by 793 days.

(21) Appl. No.: 12/472,659

(22) Filed: May 27, 2009

(65) Prior Publication Data

US 2009/0297286 A1  Dec. 3, 2009

Related U.S. Application Data

(60) Provisional application No. 61/056,558, filed on May 28, 2008.

(51) Int. Cl.
*B23B 45/14* (2006.01)
(52) U.S. Cl. ............ 408/110; 408/1 R; 408/79; 408/120
(58) Field of Classification Search ............ 408/120, 408/123, 121, 111, 79, 80, 97, 110, 1 R
See application file for complete search history.

(56) References Cited

U.S. PATENT DOCUMENTS

| | | | | |
|---|---|---|---|---|
| 1,837,390 A | * | 12/1931 | Albertson | 408/82 |
| 4,414,869 A | * | 11/1983 | Augustine | 408/111 |
| 6,099,213 A | | 8/2000 | Kammeraad et al. | |
| 6,412,376 B1 | * | 7/2002 | Borgia, Jr. | 82/113 |
| 6,729,811 B2 | | 5/2004 | Kamphuis et al. | |

* cited by examiner

*Primary Examiner* — Daniel Howell
*Assistant Examiner* — Michael Vitale
(74) *Attorney, Agent, or Firm* — Price Heneveld LLP

(57) ABSTRACT

A tool for resurfacing a counterbore of a cylinder bore in an engine block includes a holder fixedly attached to the engine block using existing threaded holes, and a cutter rotatably supported by the holder and axially movable while being rotated. The cutter is positioned to cut and resurface a counterbore in the top of the cylinder bore. A plurality of springs bias the cutter head axially toward the engine block while rotating the cutter, thus providing a uniform force while cutting and resurfacing the counterbore. A ratchet wrench matably engages the upper end of the shaft to rotate the cutter, with the ratchet wrench extending in a single lateral direction from the shaft. A related method is also discussed.

15 Claims, 6 Drawing Sheets

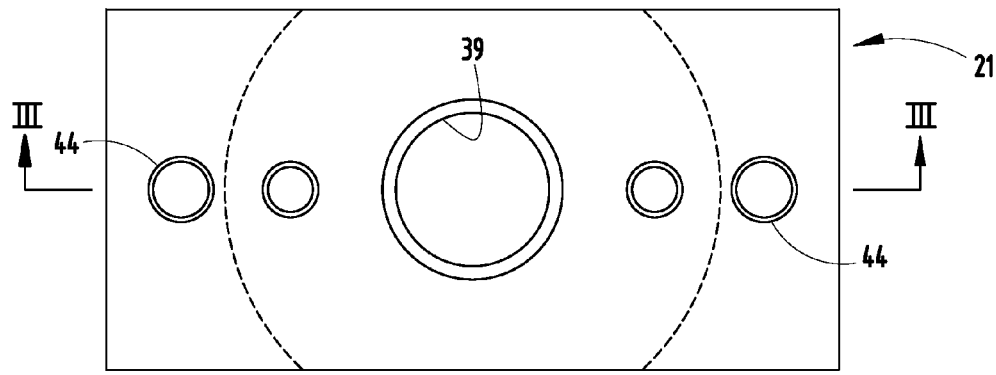
FIG. 2
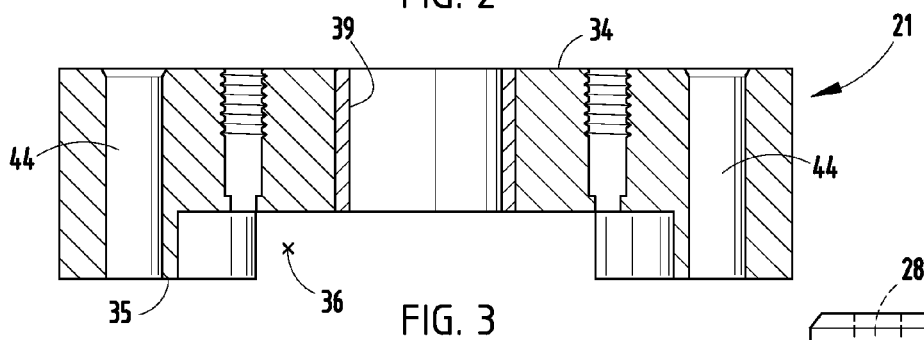
FIG. 3
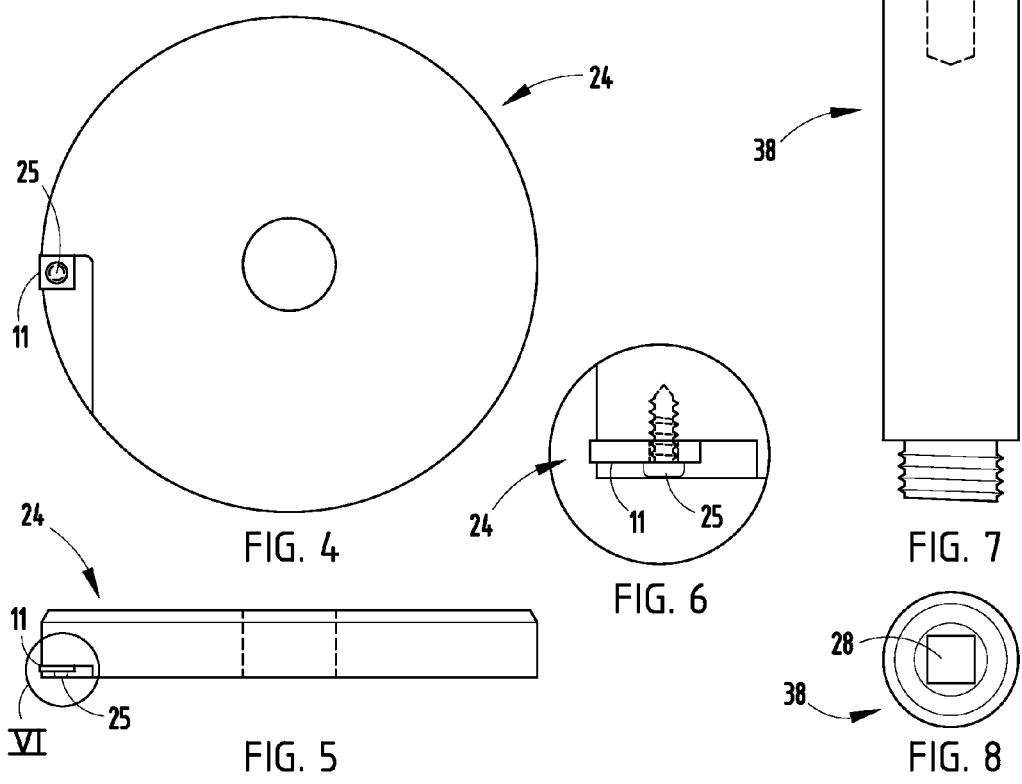
FIG. 4
FIG. 5
FIG. 6
FIG. 7
FIG. 8

CUTTER FOR MACHINING COUNTERBORE IN ENGINE BLOCK

CROSS REFERENCE TO RELATED APPLICATION

This application claims benefit under 35 U.S.C. §119(e) of provisional application Ser. No. 61/056,558, filed May 28, 2008, entitled CUTTER FOR MACHINING COUNTERBORE IN ENGINE BLOCK, the entire contents of which are incorporated herein in its entirety.

BACKGROUND

The present invention relates to tools for resurfacing a counter-bored top of a cylinder bore of an engine block, such as in a diesel engine.

Brooks U.S. Pat. No. 3,350,964 discloses a counterbore facing tool where the operator manually rotates the tool while pressing downward. A problem is that it is difficult to provide a balanced, centered and constant downward force while rotating the tool's cutter in a manner that prevents chatter and/or other surface imperfections during the rotation. Notably, the Brooks' tool is re-gripped about every 180 degrees of rotation, and the instructions for this tool state that the operator should NOT stop rotation in the same handle position (as the operator stops and regrips the T-shaped handle of the device) to avoid creating a ridge in the counterbore. Another problem is that a depth of the tool is controlled by rotation of a threaded nut (see nut 31 in U.S. Pat. No. 3,350,964), and thumb set screw (34), which requires partial depth adjustment of the nut after each rotation of the handle. This is inconvenient, time consuming, and can cause operators to be over-aggressive in the stepped adjustment so that they can finish the machining operation with fewer rotations of the tool . . . thus resulting in worse surface imperfections in the counterbore.

SUMMARY OF THE PRESENT INVENTION

In one aspect of the present invention, a tool for resurfacing a counterbore of a cylinder bore in an engine block includes a holder adapted for fixed attached to the engine block, and a cutter rotatably supported by the holder and axially movable while being rotated. The cutter includes a cutter blade positioned to cut and resurface a counterbore in the top of the cylinder bore. The cutter further includes a biasing device for biasing the cutter head axially toward the engine block while rotating the cutter.

In another aspect of the present invention, a tool for resurfacing a counterbore of a cylinder bore in an engine block includes a holder adapted for fixed attached to the engine block, and a cutter including a shaft rotatably supported by the holder and axially movable while being rotated. The cutter includes a cutter blade positioned to cut and resurface a channel into the top lip of the cylinder bore, the shaft having a configured upper end. A ratchet wrench matably engages the upper end of the shaft to rotate the cutter, with the ratchet wrench extending in a single lateral direction from the shaft.

In another aspect of the present invention, a method for resurfacing a counterbore of a cylinder bore in an engine block, comprises steps of attaching a holder to an engine block, and rotating a cutter that is rotatably supported by the holder, and axially moving the cutter while the cutter is rotated to cut and resurface a counterbore in the top of the cylinder bore. The method further includes providing a biasing device on the holder that biases the cutter automatically toward the engine block while the cutter is rotated, and biasing the cutter head axially toward the engine block while rotating the cutter.

These and other aspects, objects, and features of the present invention will be understood and appreciated by those skilled in the art upon studying the following specification, claims, and appended drawings.

BRIEF DESCRIPTION OF DRAWINGS

FIGS. 2-3 are top and cross sectional side views of the holder.

FIGS. 4-5 are top and side view of the cutter head, and FIG. 6 is an enlarged view of the circled area VI in FIG. 5.

FIGS. 7-8 are side and top end views of the cutter shaft.

DETAILED DESCRIPTION OF PREFERRED EMBODIMENTS

Figure 1:
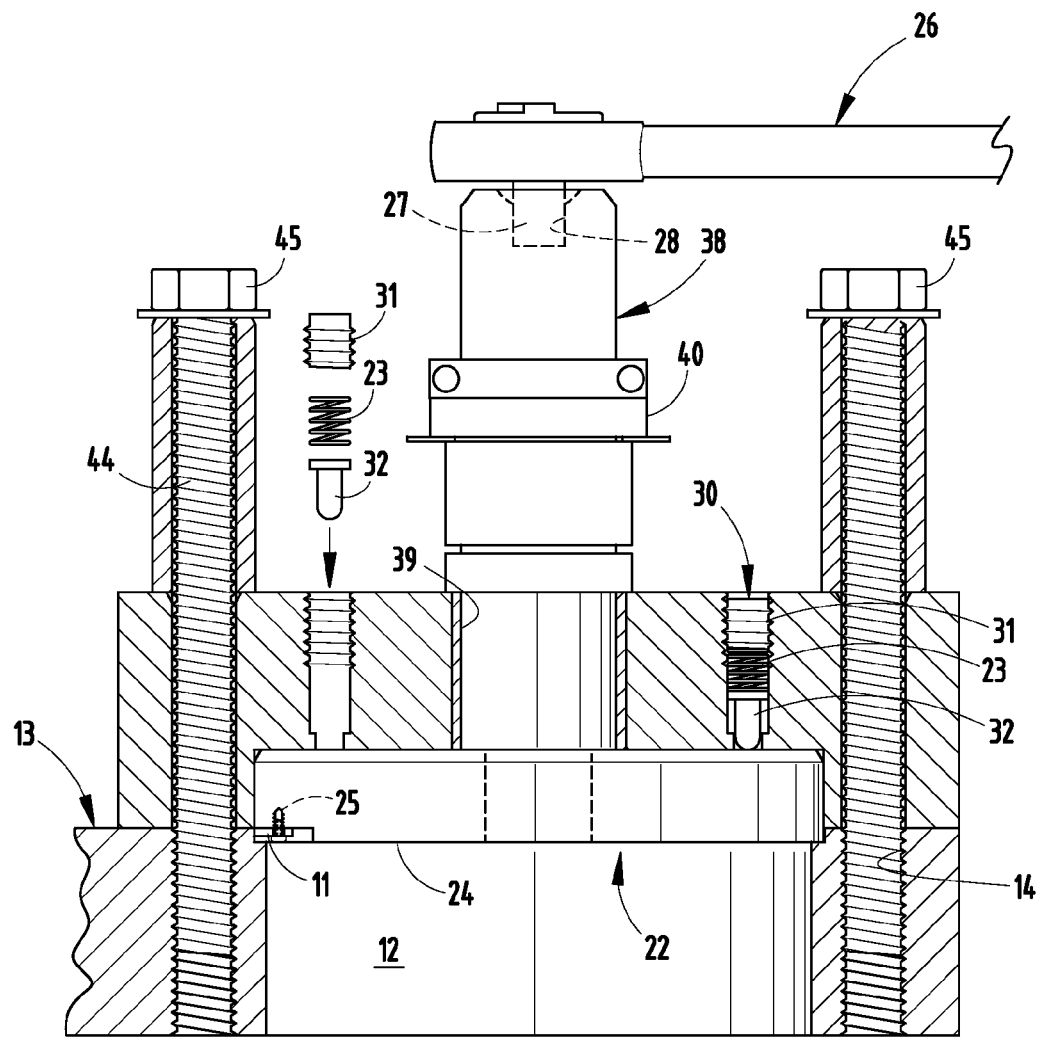
FIG. 1 is a cross sectional side view of a tool embodying the present invention and attached to an engine block, including the cutter head, the shaft, the holder, and the spring-biasing devices (one installed, one exploded away).
Figure 9:
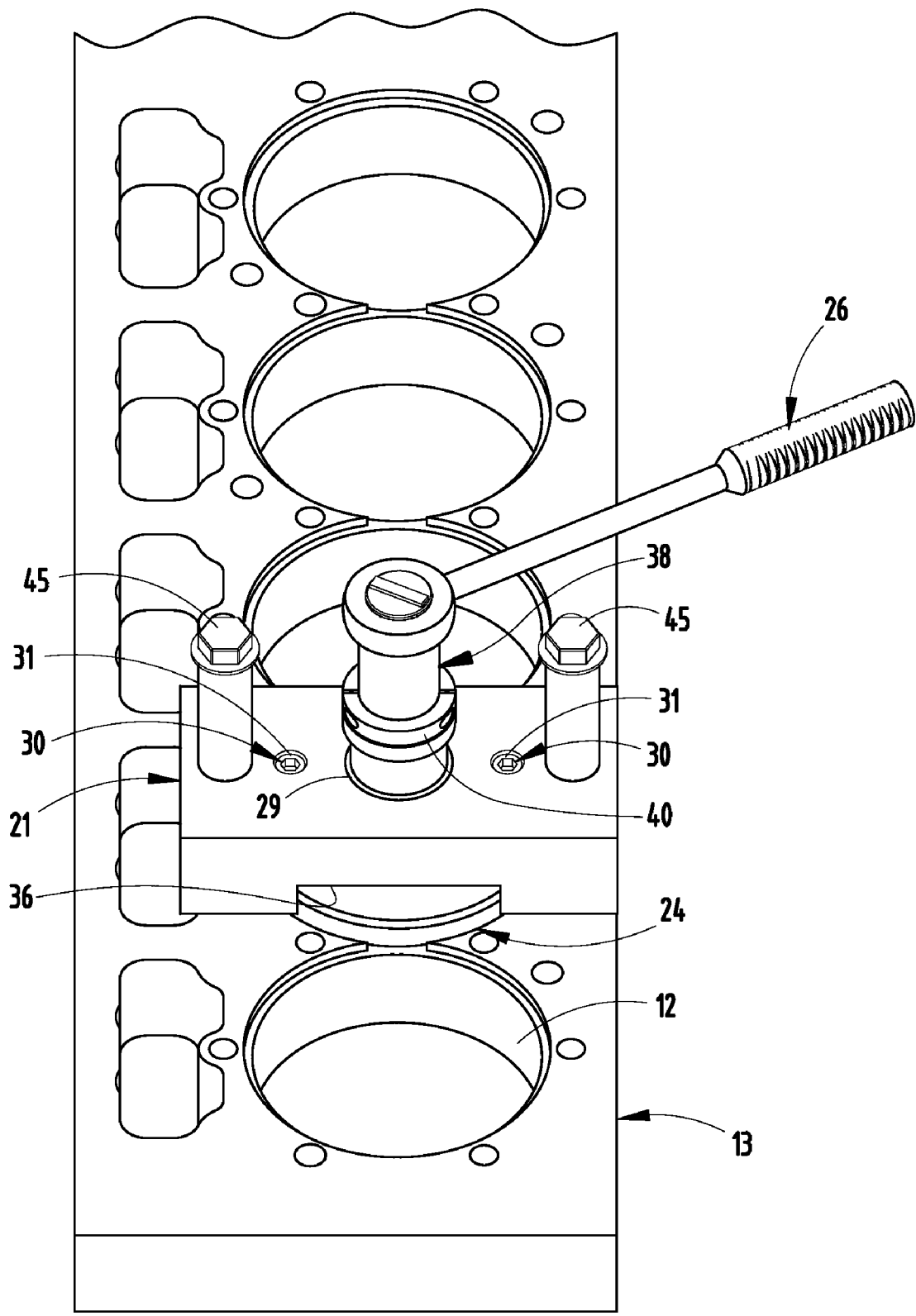
FIG. 9 is a perspective view of the present tool installed on an engine block and with a ratchet wrench engaging the tool for rotating the cutter head.
Figure 10:
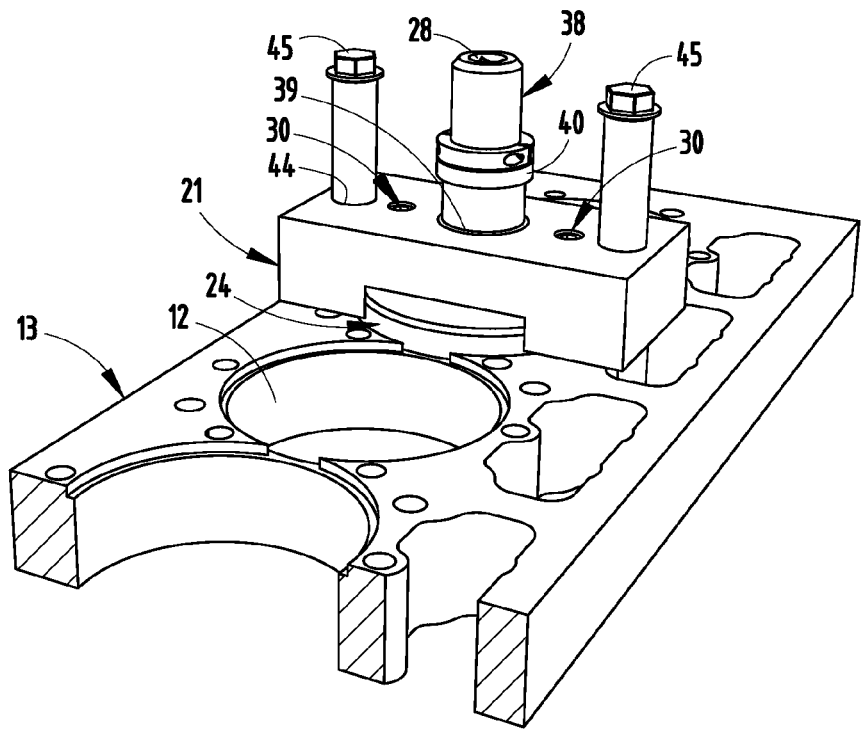
FIGS. 10-11 are perspective photographs of the tool attached to an engine block, FIG. 11 showing shims for setting a maximum depth of the cutter head.
Figure 11:
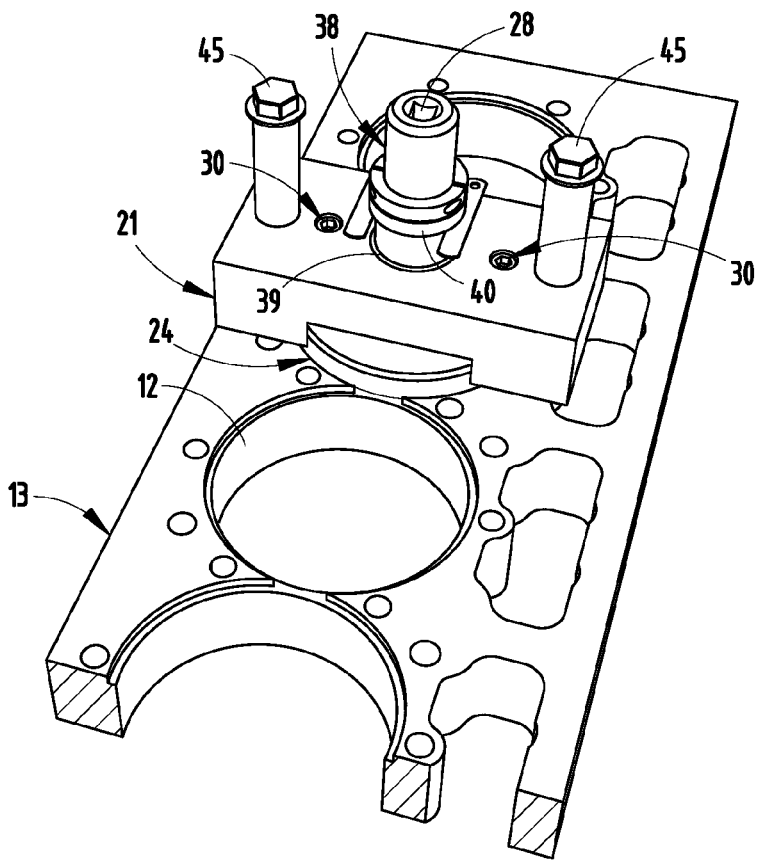
Figure 12:
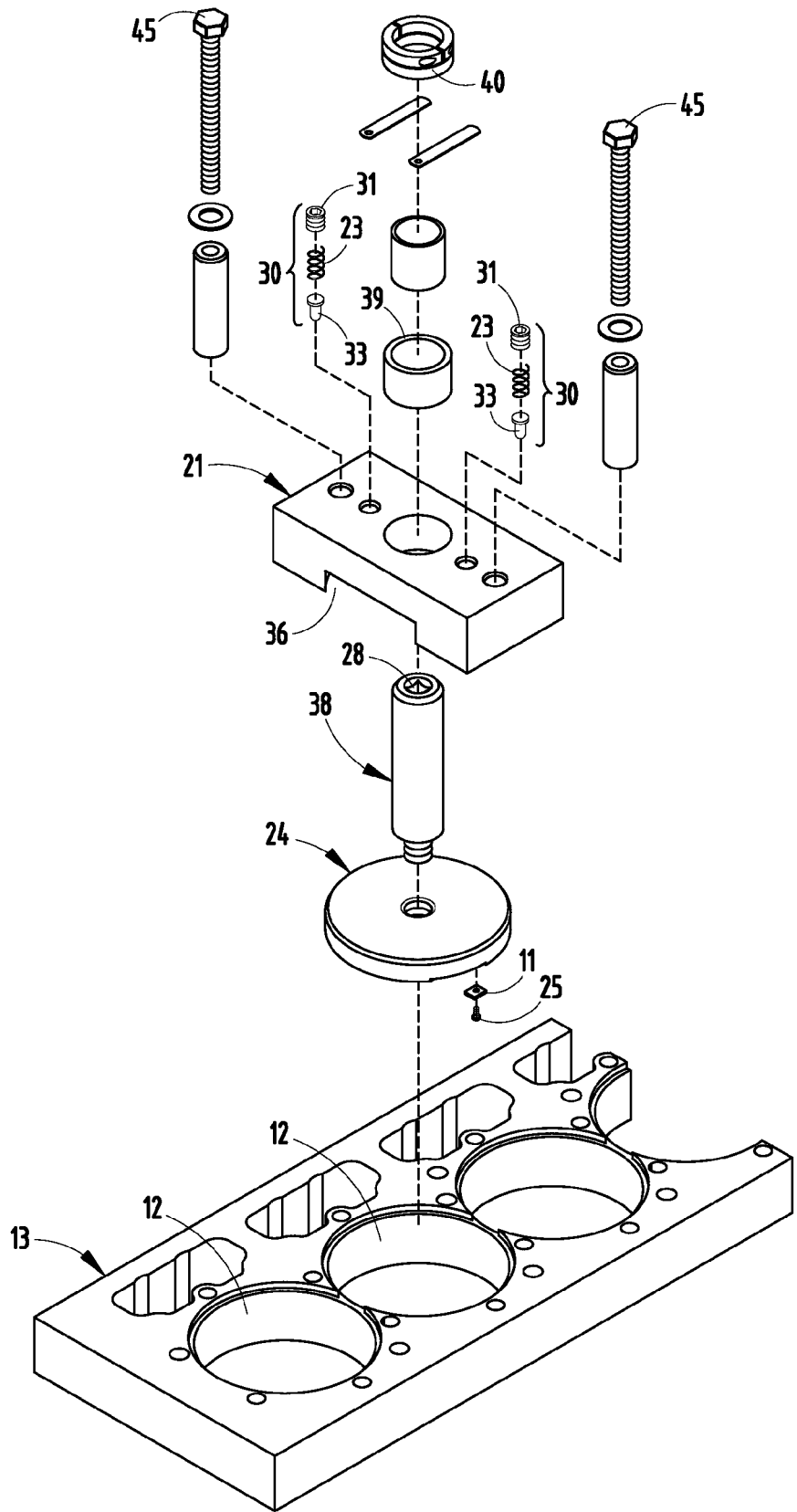
FIG. 12 is an exploded view of FIG. 11.
Figure 13:
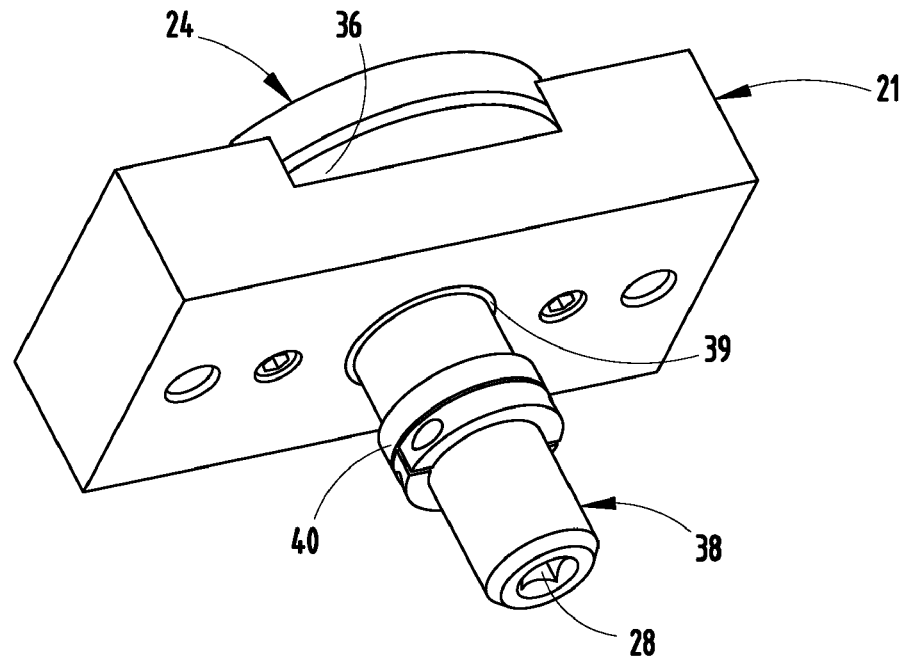
FIGS. 13-14 are top and bottom perspective views of the tool from FIG. 1, FIG. 14 having the cutter head exploded slightly away from the holder.
Figure 14:
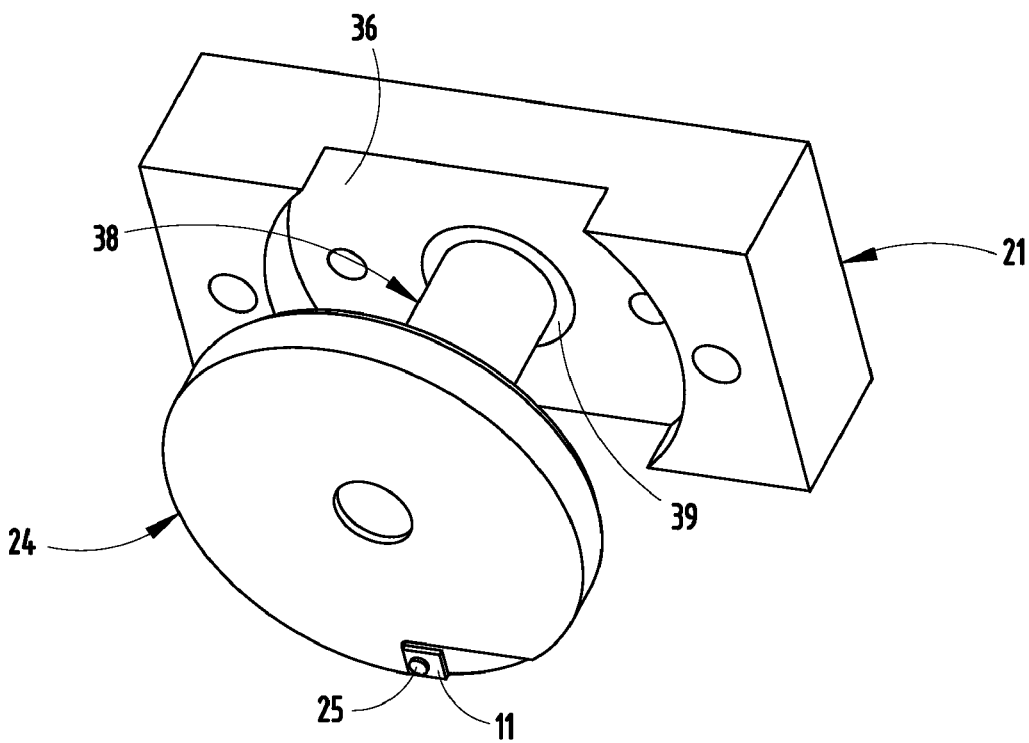

A tool 20 (FIG. 1) for resurfacing a counterbore 11 of a cylinder bore 12 in an engine block 13 includes a holder 21 fixedly attached to the engine block 13 using bolts 45 engaging existing threaded holes 14 in the block 13, and a cutter 22 rotatably supported by the holder 21 and axially movable while being rotated. The cutter 22 is positioned to cut and resurface a counterbore 11 in the top of the cylinder bore 12. A plurality of spring-biasing devices 30 (such as two spaced at 180 degrees) include spring-biased tips that engage and bias the cutter head 24 and blade 25 axially toward the engine block 13 while the cutter blade 25 is being rotated, thus providing a uniform force while cutting and resurfacing the counterbore 11 to an accurate depth. The re-cut counterbore 11 allows a (new) shim ring to be placed in the counterbore 11 during the repair procedure.

A ratchet wrench 26 includes a protrusion driver 27 that matably engages a mating pocket 28 in the upper end of the cutter shaft 38 to rotate the cutter 22. Notably, the ratchet wrench 26 extends in a single lateral direction from the shaft of the cutter. Despite the unbalanced arrangement where the wrench's handle extends in a single direction from the cutter shaft, experimentation shows that the present tool provides a very uniform and balanced cutting action that does not lead to chatter and other imperfections in the resurfaced counterbore 11. This is due in part to the stability of the holder and cutter in the holder, and also due to the spring-biased devices which provide a continuous uniform downward pressure on the cutter (without dependence on the tool operator's skill.

Specifically, the pair of modular biasing devices 30 is installed in the holder 21 to bias the cutter 22 toward the engine block 13. The illustrated biasing devices 30 each include a threaded hollow stud 31 with an internal coil spring 23 and a protruding retractable pin 32 biased outwardly by the spring 23. A plastic cap is on the pin 32 (or the pin 32 is plastic, such as nylon) for providing lubricious sliding motion when engaged against the cutter head 24. Notably, it is contemplated that other spring arrangements could be used and still be within a scope of the present invention. The illustrated spring 23 has an outward biasing force of at least about 5 pounds pressure. This force remains relatively constant throughout a stroke of the retractable pin 32. The biasing devices 30 are located between the cutter head 24 and a body 34 of the holder 21.

The holder 21 (FIGS. 2-3) includes a body 34 and end blocks 35 (integral or separate components fixed to the body 34) forming a U-shaped arrangement. The end blocks 35 are adapted to stably engage and support the body 34 on the engine block 13 above the bore 12 to thus define a space 36. The cutter 22 (FIGS. 4-5) includes a disk-shaped cutter head 24 located in the space between the body 34 and the engine block 13. A shaft 38 (FIGS. 7-8) extends from the cutter head 24 up through a lubricated bearing 39 (or bearing surface) in the holder body 34. This arrangement allows the cutter head 24 to move axially in the space toward the engine block 13.

A stop 40 (or stops) is provided on the shaft 38, and is independently adjustable and fixable to the shaft 38. For example, commercially available die locks will work for this purpose. To adjust the cutter 22 to a proper depth, the stop 40 is loosened and the cutter 22 dropped to the face of the engine block 13. A shim (or pair of shims 41) is then placed between the stop 40 and a top of the block 21 for setting a depth of the cut, and the stop 40 is fixed on the shaft 38. The stop 40 limits the cutter 22 to only cut as deep as the stops will allow . . . as set by a thickness of the shim. It is contemplated that a scope of the present invention includes other means of setting an adjusted depth of cut for the counterbore. The present adjustment is advantageously semi-intuitive once the tool is seen and understood.

The biasing devices 30 (springs 23) allow the cutting operation to be performed without the operator having to put uniform downward pressure on the cutter apparatus. Testing has shown that the present arrangement including the pair of spaced-apart biasing devices 30 and the bearing surface 39 provide for a very uniform cutting operation, even allowing the cutter to be driven by a ratchet wrench 26 gripped from an offset positioned to one side of the bore 12. (In other words, it is not necessary that the present cutter 22 be driven by a T-handle that requires both hands of the operator to apply a uniform force toward a center of the cylinder bore being cut.) The illustrated ratchet wrench 26 includes a driving stud 27 shaped to matably engage a pocketed top end of the shaft 38. The illustrated biasing devices 30 each provide a force of at least about 5 pounds pressure, but it is contemplated that more or less biasing force can be used depending upon requirements of a particular arrangement and depending on the number of biasing devices and cutters.

Notably, the holder 21 includes holes 44 that align with pre-existing threaded holes 14 in the engine block 13. This allows bolts 45 to extend through the holder 21 and threadably into the threaded holes 44 for securing the holder 21 to the engine block 13. This greatly simplifies attachment of the holder 21 to the engine block 13. Notably, it is contemplated that multiple sets of holes 44 can be provided in the holder 21 to allow the holder 21 to be adapted for use on different engine blocks. Nonetheless, it is contemplated that in its broadest sense, the present invention includes different holding mechanisms for the holder, such as magnets and/or vacuum holder (such as where vacuum is from suction cup(s) or caused by venturi connection to shop air) and/or bracket-and-strap holder and/or other holding and alignment means. The present arrangement of bolts into existing engine block holes provides both holding and alignment functions for the tool 20.

Once the new refurbished counterbore is made, a ring shim is placed therein to bring a top surface of the (new) counterbore to a desired level relative to a top flat surface of the engine block.

The method for resurfacing a counterbore of a cylinder bore in an engine block comprises steps of attaching a holder to an engine block, and rotating a cutter that is rotatably supported by the holder, and also axially moving the cutter while the cutter is rotated to cut and resurface a counterbore in the top of the cylinder bore. The method further includes providing a biasing device on the holder that biases the cutter automatically toward the engine block while the cutter is rotated, and biasing the cutter head axially toward the engine block while rotating the cutter.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A tool for resurfacing a counterbore of a cylinder bore in an engine block, comprising:
    a holder adapted for fixed attachment to the engine block;
    a cutter rotatably supported by the holder and axially movable while being rotated, and including a cutter blade positioned to cut and resurface a counterbore in the top of the cylinder bore; and
    a biasing device including at least two spaced-apart retractable pins biasing the cutter head axially toward the engine block while rotating the cutter.

2. The tool defined in claim 1, wherein the biasing device includes at least one spring positioned to bias the cutter blade away from a body of the holder.

3. A tool for resurfacing a counterbore of a cylinder bore in an engine block, comprising:
    a holder adapted for fixed attachment to the engine block;
    a cutter rotatably supported by the holder and axially movable while being rotated, and including a cutter blade positioned to cut and resurface a counterbore in the top of the cylinder bore; and
    a biasing device for biasing the cutter head axially toward the engine block while rotating the cutter,
    wherein the biasing device includes at least one spring positioned to bias the cutter blade away from a body of the holder;
    wherein the biasing device includes lubricious material on an end of the spring that slidably engages the cutter.

4. The tool defined in claim 3, wherein the spring has a force of at least about 5 pounds pressure.

5. The tool defined in claim 2, wherein the spring is located between the cutter blade and the body of the holder.

6. The tool defined in claim 1, wherein the holder includes a body and blocks adapted to support the body on the engine block above the bore to thus define a space, and the cutter includes a cutter head in the space between the body and the engine block, the cutter head being axially movable in the space toward the engine block.

7. The tool defined in claim 6, wherein the body includes a bearing, and the cutter includes a shaft rotatably supported in the bearing.

8. The tool defined in claim 7, including upper and lower stops on the shaft for limiting movement of the cutter toward the engine block, the upper and lower stops being separately attached to the shaft and adapted to facilitate adjusting a stroke depth of the cutter on the holder.

9. The tool defined in claim 7, wherein a top end of the shaft is configured to be engaged by a ratchet wrench for rotatably driving the cutter.

10. The tool defined in claim 1, wherein the holder includes holes that align with pre-existing threaded holes in the engine block, and including bolts that extend through the holder for threading into the threaded holes for securing the holder to the engine block.

11. A method for resurfacing a counterbore of a cylinder bore in an engine block, comprising steps of:

attaching a holder to an engine block;

rotating a cutter that is rotatably supported by the holder and axially moving the cutter while the cutter is rotated to cut and resurface the counterbore in a top of the cylinder bore;

providing a biasing device including at least two retractable pins on the holder that bias the cutter automatically toward the engine block while the cutter is rotated; and biasing the cutter head axially toward the engine block while rotating the cutter using the biasing device.

12. The method defined in claim 11, wherein the step of rotating includes manually rotating the cutter.

13. The method defined in claim 12, wherein the step of rotating includes engaging and rotating the cutter using a ratchet wrench.

14. The method defined in claim 11, wherein the step of rotating includes reciprocatingly rotating, stopping to regrip, and again rotating the cutter.

15. The method defined in claim 11, wherein the step of attaching a holder to the engine block includes fastening the tool to the engine block using existing holes on the engine block.

* * * * *